United States Patent [19]

Juneau

[11] 4,355,793
[45] Oct. 26, 1982

[54] VERTICAL AND HORIZONTAL CLAMP FOR T-SLOT

[76] Inventor: Raymond L. Juneau, 8704 W. Lancaster Ave., Milwaukee, Wis. 53225

[21] Appl. No.: 232,077
[22] Filed: Feb. 6, 1981
[51] Int. Cl.³ .............................................. B23Q 3/02
[52] U.S. Cl. ..................................... 269/93; 269/155; 269/99; 269/227
[58] Field of Search ....................... 269/91, 92, 93, 99, 269/152, 154, 155, 227, 100, 221, 222, 223

[56] References Cited

U.S. PATENT DOCUMENTS 811,164  1/1906  Murray .
1,329,728  2/1920  Sovereign .
1,595,916  8/1926  Osorio .
2,203,162  6/1940  Lee .
2,782,666  2/1957  Reid .

FOREIGN PATENT DOCUMENTS 124767  11/1900  Fed. Rep. of Germany ........ 269/91

Primary Examiner—Robert C. Watson
Attorney, Agent, or Firm—Wheeler, House, Fuller & Hohenfeldt

[57] ABSTRACT

Workpiece clamp assembly adapted to engage a T-slot of a work table to provide horizontal, vertical, or a combination of horizontal and vertical clamping for a workpiece positioned on said work table.

7 Claims, 11 Drawing Figures

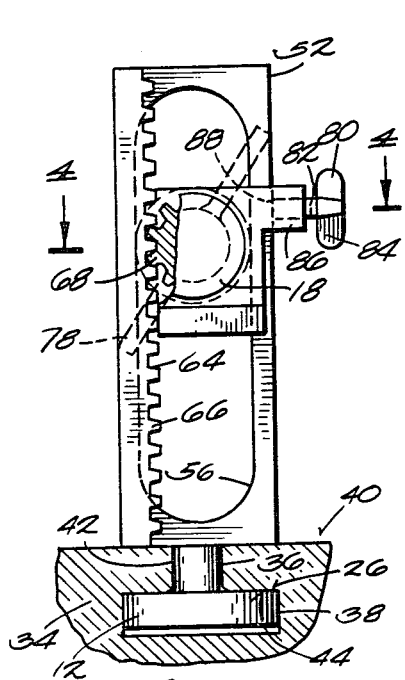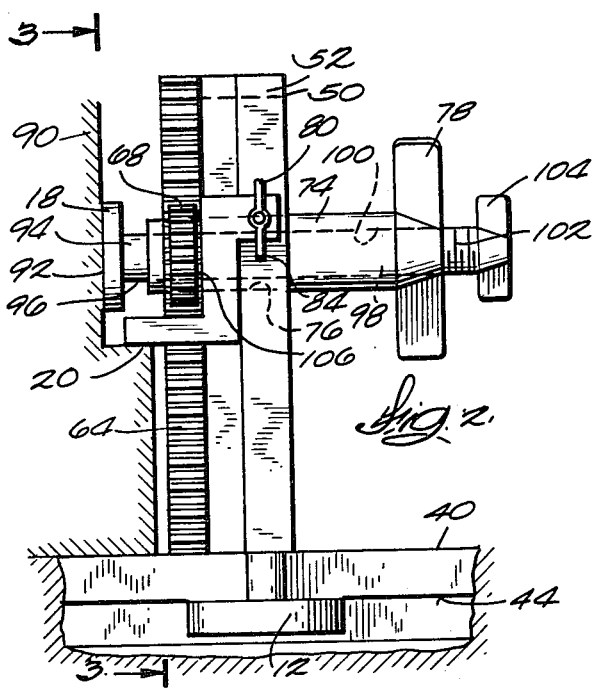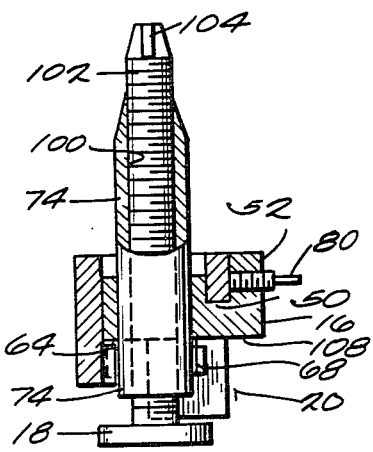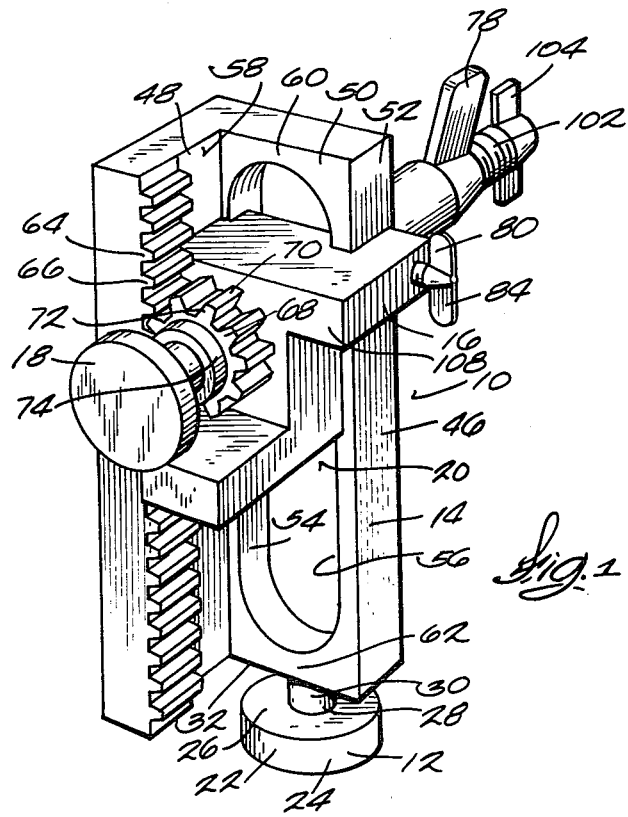

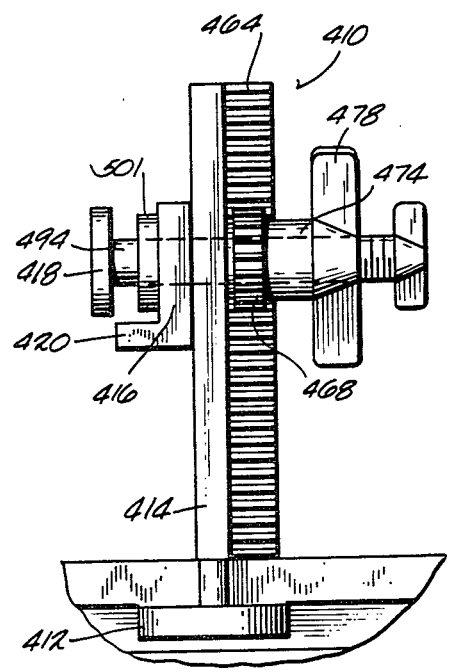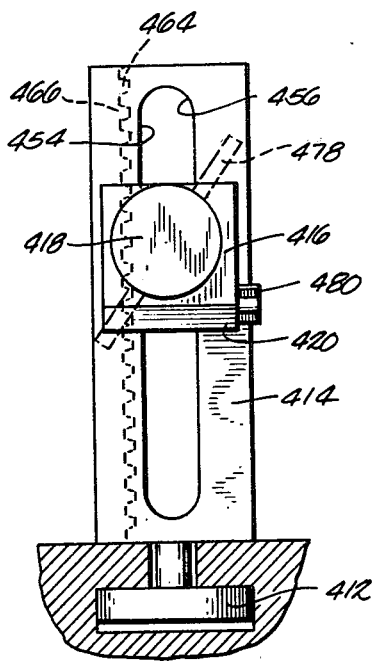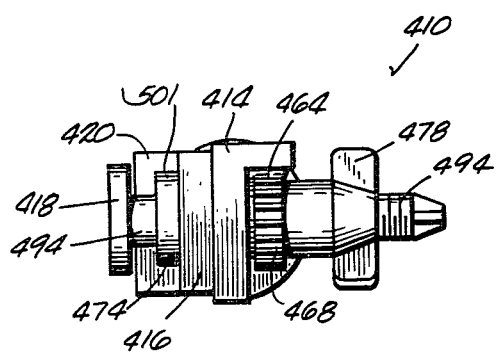

VERTICAL AND HORIZONTAL CLAMP FOR T-SLOT

BACKGROUND OF THE INVENTION

The field of the invention is that of clamping devices, more specifically, clamping devices which are adapted to reversably fix a workpiece on a work table.

The prior art shows a number of devices which are said to be useful to clamp a workpiece to a generally flat work table during a drilling operation, milling operation or other operation in which it is important to clamp the workpiece to the work table to fix it in place.

U.S. Pat. No. 1,329,728, issued to Sovereign on Feb. 3, 1920, discloses a clamping tool adapted to be attached to the face plate or table of a machine in order to hold a workpiece. FIG. 2 of Sovereign shows a T-slot (29) and slide (33) which engage to allow a clamp to be fixed on a work table at any point along a T-slot.

Several other references known to the inventor teach various forms of clamps. These references are U.S. Pat. No. 811,164, issued to Murray on Jan. 30, 1906; U.S. Pat. No. 2,203,162, issued to Lee on June 4, 1940; U.S. Pat. No. 2,782,666, issued to Reid on Feb. 26, 1957; and U.S. Pat. No. 1,595,916, issued to Osorio on Aug. 10, 1926. However, none of these references are seen to provide the combination of horizontal and vertical clamping means provided in the present invention. Also, none of these references show a clamp assembly having substantially the structure shown herein.

Accordingly, a primary object of the present invention is to provide a workpiece clamp assembly which can provide either horizontal clamping, vertical clamping or a combination of vertical and horizontal clamping while the clamp assembly is rigidly fixed with respect to a work table.

A further object of the present invention is to provide such a clamp assembly which can apply either horizontal or vertical clamping forces without being repositioned with respect to the work table.

Further objects of the present invention will become apparent from the description which follows.

SUMMARY OF THE INVENTION

The workpiece clamp assembly of the present invention comprises a combination of the following elements:

a. a T-slot slide which is adapted to engage the T-slot of a work table and to slide along the T-slot while permitting rotary motion of said workpiece clamp about an axis perpendicular to the work table when the clamp is not fixed to a workpiece;

b. a vertically disposed track attached to the T-slot slide and forming the main body of the clamp which is adapted to be rigidly fixed to the work table at a position selected by the user;

c. a clamp block which is slidably mounted on the vertically disposed track, having a vertical clamping foot for clamping a workpiece directly against the work table;

d. means to bias the clamp block toward the T-slot slide in order to provide a vertical clamping force in the direction of the work table;

e. a horizontally disposed aperture extending through said clamp block to provide means to secure and adjust a horizontal clamp;

f. a rod engaged in the aperture and having a middle section within the aperture and first and second ends protruding from the respective ends of the aperture;

g. a horizontal clamping foot attached to the first end of the rod; and h. a structure adapted to advance the rod in the aperture to advance the horizontal clamping foot horizontally away from the clamp block so that a horizontal force can be applied to a workpiece adjacent to the workpiece clamp assembly.

In one preferred embodiment of the invention a vertically disposed rack is fixed to the vertically disposed track and a pinion is engaged with the rack and pivotally attached to the clamp block so that rotation of the pinion causes it to travel up or down along the rack in order to provide vertical movement of the block along the vertically disposed track. A vertical clamping force is generated when the pinion is turned sufficiently and in the right direction to bias the clamp block against an upper surface of a workpiece, the lower surface of which rests on the work table.

In an alternate embodiment of the invention the clamp block may freely slide in the vertically disposed track, and a vertical clamping force may be provided by threading at least portions of the outer periphery of the vertically disposed track, and by providing an annular locking plate disposed above the clamp block on the vertically disposed track. The locking plate has threads on an interior surface which engage the threads on the vertically disposed track. A vertical clamping force can then be provided by sliding the clamp block into position and by then threadably advancing the locking plate downward on the vertically disposed track until the locking plate engages a horizontal top surface of the clamp block.

BRIEF DESCRIPTION OF DRAWINGS

FIG. 1 is a side perspective view of one embodiment of the invention.

FIG. 2 is a side elevational view of the embodiment of FIG. 1, showing means to attach the clamp to a work table and showing horizontal and vertical clamping of a workpiece.

FIG. 3 is an elevational view of the embodiment of FIG. 1, as viewed from the vantage point of line 3—3 of FIG. 2, partially cut away to reveal the pinion gear.

FIG. 4 is a horizontal section taken along line 4—4 of FIG. 3.

FIG. 9 is a side elevational view of an alternate embodiment of the present invention.

FIG. 10 is a front elevational view of the embodiment of FIG. 9.

FIG. 11 is a top plan view of the embodiment of FIG. 10.

DETAILED DESCRIPTION OF THE INVENTION

Figure 5:
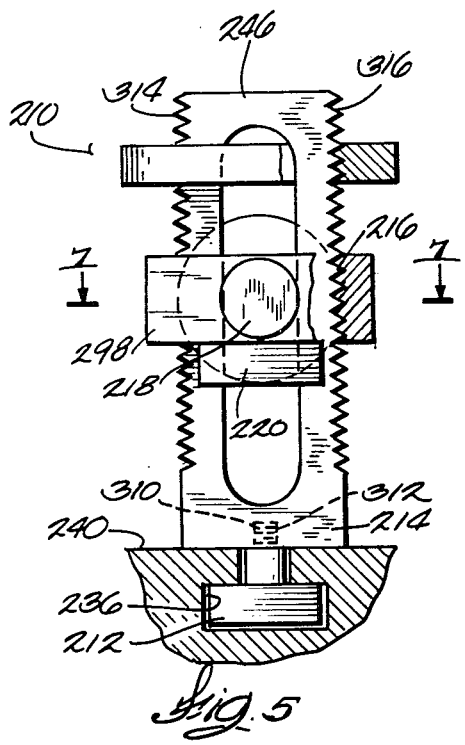
FIG. 5 is a side elevational view of an alternate embodiment of the invention.

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

FIG. 1 shows the arrangement of the various parts of the invention, as well as a specific embodiment of the invention which incorporates a rack and pinion to raise or lower the clamping block.

In FIG. 1, clamp 10 generally comprises a T-slot slide 12, a vertically disposed track 14, a clamp block 16, a horizontal clamping foot 18 and a vertical clamping foot 20 formed by the base of clamp block 16.

T-slot slide 12 has a foot portion 22 with a peripheral portion 24 and a top surface 26. Attached to foot portion 22 of T-slot slide 12, is a neck portion 28 having a peripheral surface 30. T-slot slide 12 is attached to vertically disposed track 14 immediately adjacent the base 32 of track 14 so that rack 14 is maintained in a vertical position with respect to work table 34.

The engagement of T-slot slide 12 with work table 34 is best shown in FIG. 3 in which a vertical cross-section of the T-slot slide 12 in a T-slot 36 is shown. T-slot 36 comprises a relatively wide channel 38 which runs parallel to the work support surface 40 of work table 34. It should be noted, however, that the long dimension of wide channel 38 of T-slot 36 is not necessarily linear, so long as T-slot slide 12 is capable of sliding along the entire useful T-slot 36. Communicating between wide channel 38 and work support surface 40 is a narrow channel 42, which runs along the entire useful length of wide channel 38.

T-slot slide 12 is adapted to fit within T-slot 36 and to be slidable along T-slot 36. The foot portion 22 of T-slot slide 12 is adapted to fit within wide channel 38 of T-slot 36. Although the peripheral portion 24 of foot portion 22 can have any profile, in a highly preferred embodiment of the present invention peripheral portion 24 of foot portion 22 has a cylindrical profile to allow clamp 10 to be rotated about a vertical axis while T-slot slide 12 is within T-slot 36. Alternatively, T-slot slide neck portion 28 may rotate around a vertical pivot with respect to base 32 of vertically disposed track 14 so that vertically disposed track 14 may be rotated about a vertical axis without requiring T-slot slide 12 to be rotatable within T-slot 36.

T-slot neck portion 28 has a peripheral surface 30 which slidably fits within narrow channel 42 of T-slot 36 when T-slot slide 12 is within T-slot 36 in order to allow a connection between vertically disposed track 14 and T-slot slide 12 when the clamp is engaged within T-slot 36 of work table 34.

Rotation of the clamp about any horizontal axis is prevented while T-slot slide 12 is engaged in T-slot 36, due to the close sliding fit provided between top surface 26 of T-slot slide foot portion 22 and the downward facing surface 44 of wide channel 38.

Returning to FIG. 1, vertically disposed track 14 preferably comprises a body portion 46 having several vertically disposed faces 48,50,52, and 54 which are visible in FIG. 1, as well as vertically disposed faces 56 and 58 which are not visible in FIG. 1. These faces are the principal vertically disposed faces of body portion 46 of vertically disposed track 14.

As will be seen, the vertically disposed faces of body portion 46 of track 14 are arranged so that clamp block 16 engaged therewith cannot rotate about any horizontal axis with respect to vertically disposed track 14 while the clamp is in use.

Clamp block 16 is slidably mounted on vertically disposed track 14 in order to allow vertical clamping foot 20 to move up and down with respect to T-slot slide 12, and thus with respect to work support surface 40, when T-slot slide 12 is engaged in T-slot 36. Clamp block 16 has numerous vertically disposed faces (not shown) which are parallel to and immediately adjacent vertically disposed faces 48,50,52,54,56, and 58 of vertically disposed track 14. It can easily be seen that the close sliding fit between vertically disposed faces 48,50,52,54,56 and 48 of body portion 46 of vertically disposed track 14 with the corresponding faces of clamp block 16 captures clamp block 16. It is highly desirable to provide such a configuration of clamp block 16 and vertically disposed track 14 to prevent the clamp from falling apart when it is used or stored. In the embodiment of FIG. 1, the vertical motion of clamp block 16 is vertically disposed track 14 is limited by upper and lower cross members 60 and 62 of body portion 46 of vertically disposed track 14. Alternatively, upper cross member 60 may be omitted if it is desirable to allow clamp block 16 to be easily removed from vertically disposed track 14.

Referring now to FIGS. 1 and 2, in this embodiment of the invention rack and pinion means are provided in order to allow clamp block 16 to be easily raised and lowered within the confines of vertically disposed track 14. A rack 64 having regularly spaced teeth such as 66 is attached to, and preferably made integral with, body portion 46 of vertically disposed track 14. A pinion gear 68, having regularly spaced teeth such as 70 extending radially outward from its cylindrical periphery 72 is fixedly mounted to a sleeve 74 which passes through, and is rotatably carried within, aperture 76. Aperture 76 is horizontally disposed, and is bounded by an interior portion of clamp block 16. Pinion gear 68 is arranged with respect to rack 64 so that the teeth 70 of pinion gear 68 engage the teeth 66 of rack 64. A pinion rotation handle 78 is attached to sleeve 74 to allow sleeve 74, and thus pinion gear 68, to be rotated. Rotation of pinion rotation handle 78 thus rotates pinion gear 68 with respect to rack 64, causing a vertical force to be transmitted to clamp block 16 with respect to vertically disposed track 14. The vertical position of clamp block 16 is thus adjusted as desired along vertically disposed track 14.

In a preferred mode of the invention, reversible stop means 80 are provided to temporarily arrest the motion of clamp block 16 with respect to vertically disposed track 14. Reversible stop means 80 can be used either to simply maintain clamp block 16 in a preselected position along vertically disposed track 14 or to maintain the bias of clamp block 16 toward T-slot slide 12 which is created by forcing vertical clamping foot 20 against an object rested on work support surface 40 using a force applied via rotation handle 78 and sleeve 74 to pinion gear 68, which is then borne vertically downward with respect to rack 64.

Reversible stop means 80 preferably comprises a threaded rod 82 to which is attached a rotatable head 84 which may be engaged by one's hand or a suitable implement to threadably advance threaded rod 82 within a threaded aperture 86 to cut into clamp block 16. Advancement of threaded rod 82 within threaded aperture 86 is continued until bearing face 88 of reversible stop means 80 is biased against vertical face 52 of body portion 46 of vertically disposed track 14. To disengage reversible stop means 80 to free clamp block 16 with respect to vertically disposed track 14, threaded rod 82 is threadably retracted within threaded aperture 86 using one's hand or a suitable implement.

The horizontal clamping means of the embodiment of FIGS. 1 through 4 will now be described in greater detail. These means are seen especially well in FIGS. 2 and 4.

In FIG. 2, a horizontal clamping foot 18 is shown which bears against workpiece 90 at its work engaging surface 92. Horizontal clamping foot 18 is attached to a horizontally disposed rod 94 at a first end 96 of said rod. Horizontally disposed rod 94 has a threaded central portion 98 which is threadably held within a corresponding threaded portion 100 in the interior of sleeve 74. Sleeve 74 and horizontally disposed rod 94 are concentric. Horizontally disposed rod 94 has a second end 102 which carries a rotatable head 104 to allow horizontally disposed rod 94 to be threadably advanced or retracted within sleeve 74.

To apply a horizontal clamping force with the embodiment of FIGS. 1 through 4, rotatable head 104 of horizontally disposed rod 94 is turned with one's hand or a suitable implement in order to advance horizontally disposed rod 94 to the left with respect to sleeve 74 in FIG. 2. Sleeve 74 is prevented from moving to the right in FIG. 2 by pinion gear 68 because the right-hand side of pinion gear 68 (FIG. 2) bears against face 108 of clamp block 16. It will sometimes be necessary in this embodiment to hold pinion rotation handle 78 while rotatable head 104 of horizontally disposed rod 94 is rotated in order to prevent rotation of pinion gear 68 with respect to rack 64. Advancement of horizontally disposed rod 94 to the left (FIG. 2) forces horizontal clamping foot 18 to the left and allows it to be moved (or biased) toward workpiece 90.

Although in the embodiment of FIGS. 1 through 4 the sleeve 74 used to move pinion gear 68 and the horizontally disposed rod 94 are concentric, in an alternate embodiment of the invention the pinion rotation means and the horizontal clamping foot advancing and retracting means could be placed in independent horizontally disposed apertures without departing from the invention. In such an alternate embodiment, the two horizontally disposed apertures would not necessarily be parallel, but could be skewed instead.

The embodiment of the present invention characterized in FIGS. 5,6,7 and 8 will now be described in further detail. Parts of the embodiment of FIGS. 5 through 8 which correspond to parts of the embodiments of FIGS. 1 through 4 are numbered so that the parts in FIGS. 5 through 8 have a reference character which is two hundred units greater than the corresponding reference character in FIGS. 1 through 4.

Referring now to FIG. 5, a clamp 210 is provided, generally comprising a T-slot slide 212 to which is mounted a vertically disposed track 214 carrying a clamp block 216. Clamp block 216 is adapted to slide vertically within the confines of vertically disposed track 214. Horizontal clamping foot 218 is attached to clamp block 216 by means described below. Lower extreme 220 of clamp block 216 is a vertical clamping foot.

The relation of T-slot slide 212 to the T-slot 236, the work support surface 240 and the vertically disposed track 214 is substantially identical to the relation of these elements in the embodiment of FIGS. 1 through 4.

However, FIG. 5 does additionally show alternate means by which T-slot slide 212 may be attached to vertically disposed track 214. The two are connected by a vertical threaded rod concentric with the axis of rotation of T-slot slide 212, which threadably engages threaded hole 312 of vertically disposed track 214. Other means of attaching T-slot slide 212 to vertically disposed track 214 in fixed or pivotal relationship can easily be devised.

In this embodiment of the invention no means are necessarily provided to inhibit vertical sliding motion of clamp block 216 with respect to vertically disposed track 214 in the absence of a workpiece. Thus, clamp block 216 is moved into position initially by raising it to allow clearance for a workpiece such as workpiece 290, positioning the workpiece as in FIG. 6 and lowering clamp block 216 until it touches an upper surface of workpiece 290. Means such as those described below are then employed to bias clamp block 216 toward said T-slot slide 212 in order to apply a clamping force to workpiece 290.

The means to bias clamp block 216 toward T-slot slide 212 generally comprises locking plate 318 and threaded exterior portions 314 and 316 of body portion 246 of vertically disposed track 214.

Figure 6:
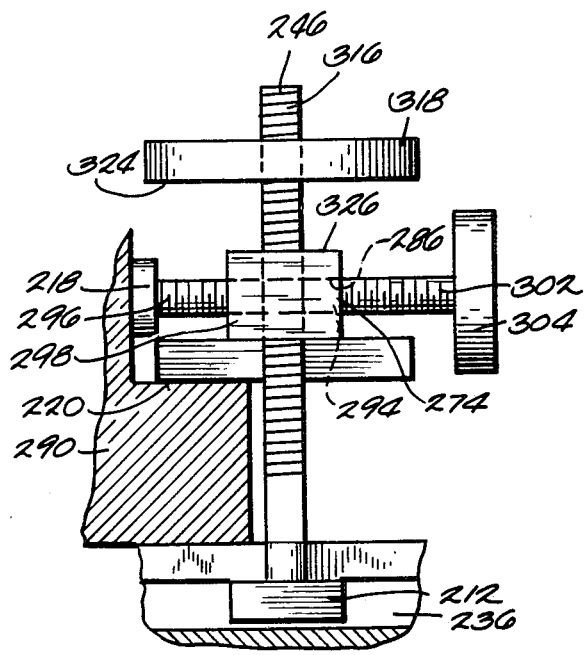
FIG. 6 is a side elevational view of the embodiment of FIG. 5, rotated 90 degrees with respect to FIG. 5.
Figure 7:
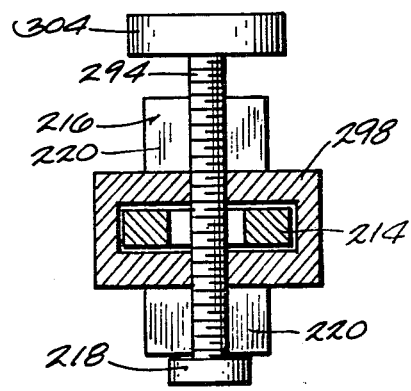
FIG. 7 is a horizontal cross-section of FIG. 5 in the plane of line 7—7.
Figure 8:
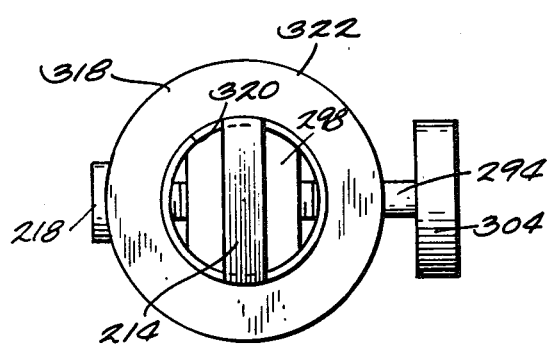
FIG. 8 is a plan view of the embodiment of the invention shown in FIG. 6.

Locking plate 318, best shown in FIGS. 6 and 8, is annular, and has a threaded interior side wall 320, an exterior side wall 322, and a lower bearing face 324.

The threaded interior side wall 320 of locking plate 318 engages the threaded exterior portions 316 and 314 of body portion 246 of vertically disposed track 214. Exterior side wall 322 of locking plate 318 may be grasped by one's hand or a suitable implement in order to threadably advance or retract locking plate 318 along threaded exterior portions 314 and 316 of body portion 246 to raise or lower locking plate 318. When clamp block 216 is lowered to the desired position with respect to workpiece 290, locking plate 318 is threadably advanced until its lower bearing face 324 bears against upper bearing face 326 of clamp block 216. This causes vertical clamping foot 220 to bear downward against workpieces 290 in the direction of T-slot slide 212 in order to apply a vertical clamping force to workpiece 290.

The horizontal clamping means of the embodiment of FIGS. 5 through 8 is carried in a horizontally disposed sleeve 274 which is rigidly attached to clamp block 216. A threaded aperture 286 passes through sleeve 274 in a substantially horizontal direction. A horizontally disposed threaded rod 294 passes through threaded aperture 286. Threaded rod 294 has a first end 296 extending from one end of sleeve 274, a central threaded portion 298 engaging the threaded portion of threaded aperture 286 and a second end 302 to which a rotatable head 304 is attached. Rotation of rotatable head 304 threadably advances or retracts horizontally disposed threaded rod 294 within threaded aperture 286 and thus advances or retracts horizontal clamping foot 218 to horizontally orient horizontal clamping foot 218, and to allow horizontal clamping foot 218 to be biased against a vertical surface of workpiece 290.

The embodiment shown in FIGS. 9, 10 and 11 will now be described. Parts of this embodiment which correspond to parts of the embodiment shown in FIGS. 1-4 are identified by reference characters having the same last two digits, preceded by a "4".

In the clamp 410 of FIGS. 9, 10 and 11 the rack and pinion means (464 and 468) for raising and lowering clamp block 416 along track 414 in FIGS. 9, 10 and 11 has been moved axially along sleeve 474 to the side of track 414 which is nearest pinion rotation handle 478. This change prevents interference of rack 464 with objects to be clamped, and is thus an improvement over the clamp of FIGS. 1-4 for vertically clamping the edge of an object.

To slidably secure clamp block 416 to vertically disposed track 414, the vertically disposed faces 454 and 456 defining the central opening in track 414 are spaced closer together than the width of clamp block 416 or of pinion 464, and the teeth 466 of rack 464 are recessed with respect to vertically disposed face 454.

To prevent sleeve 474 from being withdrawn from clamp block 416, a collar 501 is provided thereon.

Reversible stop means 480 can be provided in the embodiment of FIGS. 9-11 to bear on any vertical face of vertically disposed track 414 which is adjacent a vertical face of clamp block 416.

Except for the noted changes, the parts of the embodiment of FIGS. 9-11 are essentially the same as the parts of FIGS. 1-4. Thus, clamp 410 comprises a T-slot slide 412, a vertically disposed track 414 mounted axially of slide 412, a clamp block 416 slidably mounted on track 414, a horizontal clamping foot 418 engaging block 416, and a vertical clamping foot 420 attached to block 416. Horizontal clamping foot 418 is carried on a rod 494 threadably carried within sleeve 474. Sleeve 474 is rotatable within clamp block 416 but cannot be withdrawn or inserted axially. Pinion 468 fixed coaxially to sleeve 474 engages rack 464 so that rotation of handle 478 moves clamp block 416 up or down, as desired.

Many other variations can be applied to the embodiments of FIGS. 1 through 11 of the present invention without departing from the scope of the present invention.

For one example, two or more clamp mechanisms can be carried on a single vertically disposed track in order to provide multiple clamping means.

Second, the vertically disposed track can be disposed along an oblique or horizontal line.

Third, the rack and pinion vertical positioning means of FIGS. 1-4 and 9-11 can be incorporated in the embodiment of FIGS. 5 through 8, or the rack and pinion mechanism may be deleted from the embodiments of FIGS. 1-4 or 9-11 and replaced with another vertical positioning mechanism.

The clamps of the present invention will find many uses in woodworking, metal working, and other workpiece manipulating parts in which it is desirable to apply both vertical and horizontal clamping forces, or either type of force alone, without re-positioning the clamp on the work table on which it is attached. One or several such clamps may be deployed depending on the size and shape of the workpiece and the directional forces which are to be applied to it in a workpiece manipulating operation.

I claim:

1. A workpiece clamp assembly comprising:
   a. a T-slot slide;
   b. a vertically disposed track attached to said T-slot slide;
   c. a clamp block slidably mounted on said track and having vertical clamping foot means at its lower extremity;
   d. means to bias said clamp block toward said T-slot slide;
   e. a horizontally disposed aperture extending through said clamp block;
   f. a sleeve rotatably disposed within said aperture, said sleeve having first and second ends protruding from the respective ends of said aperture;
   g. a rod having a central portion enclosed within said sleeve and first and second ends protruding from the respective ends of said sleeve;
   h. a horizontal clamping foot attached to the first end of said rod; and
   i. means to advance said rod in said sleeve to advance said horizontal clamping foot horizontally away from said clamp block.

2. The workpiece clamp assembly of claim 1, wherein said pinion has a concentric face which bears against said clamp block, adjacent said first end of said aperture, when said horizontal clamping foot is subjected to a horizontal clamping force in use.

3. The workpiece clamp assembly of claim 2, wherein means are provided to threadably advance said rod within said sleeve, whereby to move said horizontal clamping foot horizontally away from said clamp block.

4. The workpiece clamp assembly of claim 1, wherein said T-slot slide is adapted to rotate about a vertical axis when said T-slot slide is within the confines of a T-slot.

5. A workpiece clamp assembly comprising:
   a. a T-slot slide;
   b. a vertically disposed track attached to said T-slot slide;
   c. a clamp block slidably mounted on said track and having vertical clamping foot means at its lower extremity;
   d. a locking plate threadably engaged to an exterior portion of said track, disposed above said clamp block, and bearing upon the upper extremity of said clamp block, whereby to bias said clamp block toward said T-slot slide;
   e. a horizontally disposed aperture extending through said clamp block;
   f. a rod engaged in said aperture and having first and second ends protruding from the respective first and second ends of said aperture and a central portion within said aperture;
   g. a horizontal clamping foot attached to the first end of said rod; and
   h. means to advance said rod in said aperture to advance said horizontal clamping foot horizontally away from said clamp blocks.

6. The workpiece clamp assembly of claim 5, wherein said rod is threadably engaged in said aperture, whereby threadable advancement of said rod within said aperture moves said horizontal clamping foot horizontally away from said clamp block.

7. The workpiece clamp assembly of claims 3 or 6, wherein means are provided to lock said clamp block at a selected position along said track.

* * * * *